May 27, 1924.

W. W. LA VAN WAY

AUTOMOBILE THEFT LOCK

Filed Oct. 20, 1921

Inventor:
WILLIAM W. LA VAN WAY
By Hazard & Miller
Attorneys

May 27, 1924.
W. W. LA VAN WAY
AUTOMOBILE THEFT LOCK
Filed Oct. 20, 1921
1,495,700
2 Sheets-Sheet 2
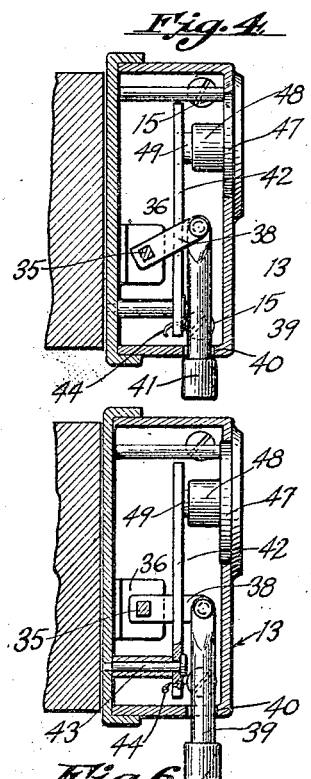
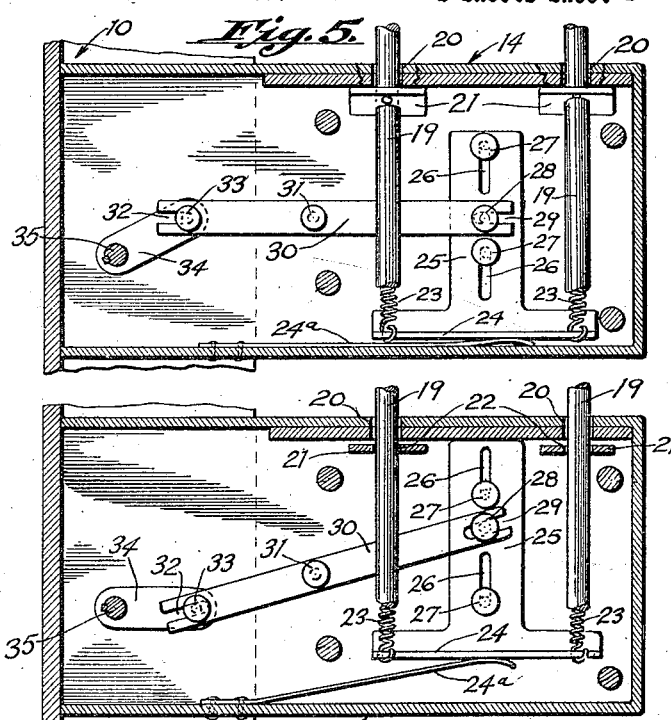
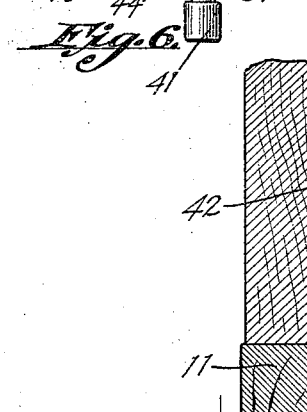
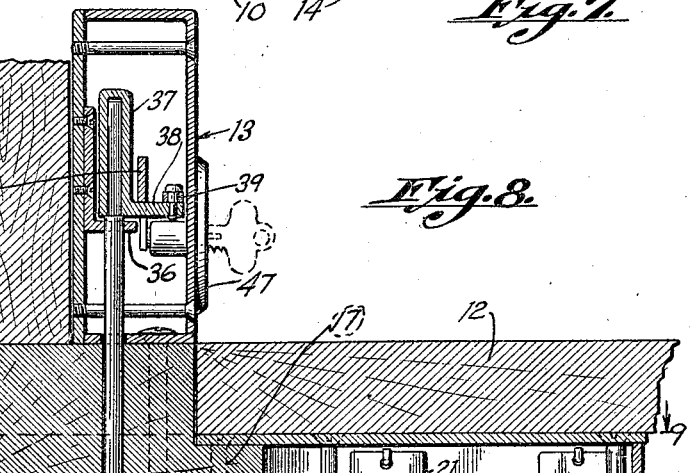
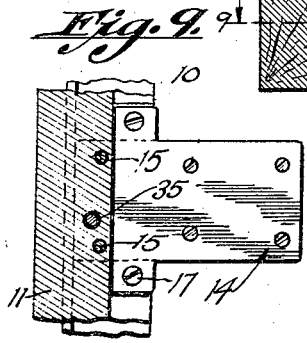
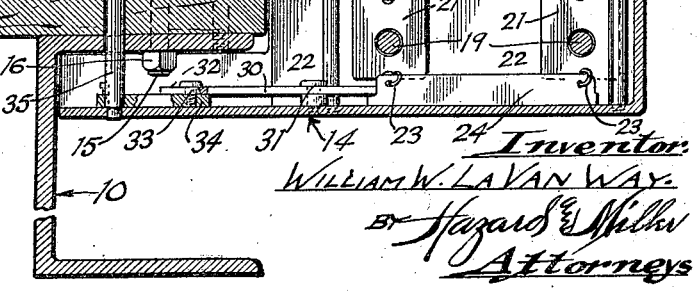
Inventor:
WILLIAM W. LA VAN WAY.
By Hazard & Miller
Attorneys Patented May 27, 1924.

1,495,700

UNITED STATES PATENT OFFICE.

WILLIAM W. LA VAN WAY, OF LONG BEACH, CALIFORNIA.

AUTOMOBILE THEFT LOCK.

Application filed October 20, 1921. Serial No. 508,925.

*To all whom it may concern:*

Be it known that I, WILLIAM W. LA VAN WAY, a citizen of the United States, residing at Long Beach, in the county of Los Angeles and State of California, have invented new and useful Improvements in Automobile Theft Locks, of which the following is a specification.

My invention relates to a locking device for motor vehicles, the principal object of my invention being to provide relatively simple, practical and effective means that is adapted to engage parts of the operating mechanism of a vehicle, preferably the pedals utilized for actuating the clutch and brake, and which locking device will be effective in preventing the theft or unauthorized use of the vehicle to which it is applied.

Further objects of my invention are to provide a motor vehicle locking device wherein practically all of the operating parts of the lock are wholly inclosed in metal boxes or housings, and which latter are secured to each other and to the wood and metal frame of the vehicle, so that it is practically impossible for said parts to be readily removed or broken by persons making an attempt to steal the vehicle to which the device is applied; further to provide a locking device of the character described that may be easily and cheaply produced, applicable for use in connection with practically all makes of motor vehicles, and further to provide a lock that may be easily and cheaply installed and which will be very effective in performing its intended functions.

With the foregoing and other objects in view, my invention consists in certain novel features of construction and arrangement of parts that will be hereinafter more fully described and claimed and illustrated in the accompanying drawings, in which:

Fig. 4 is a horizontal section taken approximately on the line 4—4 of Fig. 2.

Fig. 5 is a horizontal section taken approximately on the line 5—5 of Fig. 2.

Fig. 6 is a horizontal section taken approximately on the line 6—6 of Fig. 3.

Fig. 7 is a horizontal section taken approximately on the line 7—7 of Fig. 3.

Fig. 8 is an enlarged cross section taken approximately on the line 8—8 of Fig. 1.

Fig. 9 is a horizontal section taken approximately on the line 9—9 of Fig. 8.

Figure 1:
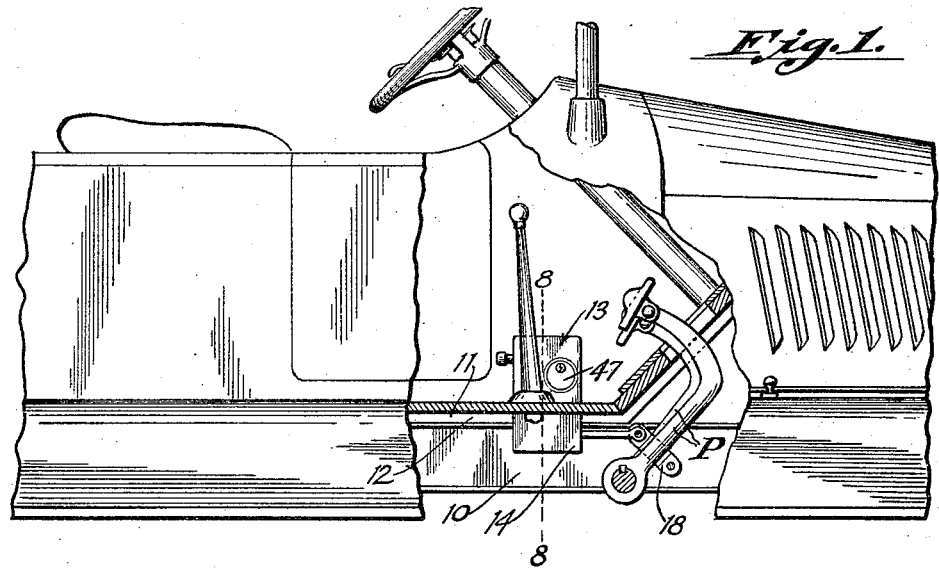
Figure 1 is a side elevational view of a portion of the motor vehicle with parts thereof broken away and showing a locking device of my improved construction applied to said vehicle and associated with the clutch and brake pedals thereof.
Figure 2:
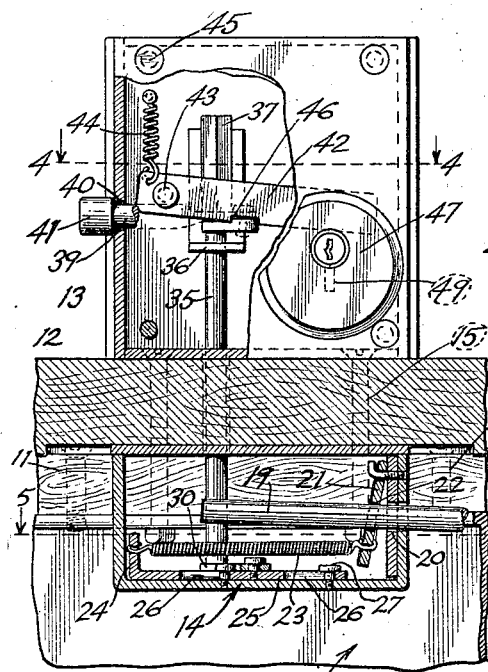
Fig. 2 is a vertical section taken through the floor of the vehicle and through the lower housing of the locking device, and showing the parts thereof in position to lock the clutch and brake pedals against movement.

Referring by numerals to the accompanying drawings which illustrate a practical embodiment of my invention, 10 designates one of the side members of the frame of the chassis, which member is preferably channel-shape in cross section with its flanges inwardly presented, and positioned directly on top of said frame member is the usual wooden sill 11 forming a part of the frame of the body or tonneau, and extending inwardly from said sill 11 are the usual floor boards 12.

My improved locking mechanism is contained in a pair of metal housings or boxes, one of which, designated by the numeral 13, occupies a position on top of the sill 11 immediately to the left and rear of the clutch and brake operating pedals, and the other box or housing 14 occupying a position immediately below the floor boards 12 and adjacent to the portions of the channel 10 and sill 11 above which the box or housing 13 is positioned. The box or housing 13 is secured to channel 10 and sill 11 by a bolt, such as 15, that extends through the bottom of said housing 13, and through the said channel and sill, the lower end of said bolt receiving a nut 16. The lower housing 14 is secured to channel 10 and sill 11 by screws or bolts 17 that extend through an extended portion of the top of said box or housing 14, downwardly through a part of said sill 11, and into or through the top flange of channel 10.

Secured in any suitable manner to the clutch and brake actuating pedals P below the floor boards of the machine, are yokes or collars, such as 18, and pivotally connected to the upper end of each yoke or collar is the forward end of a horizontally disposed rod, such as 19, and the rear portions of these two rods extend through openings 20 that are formed in the front wall of housing 14 so that said rear portions of the rods are positioned within said housing.

Pivotally suspended above each opening 20 is a hardened metal plate 21, the same being provided with an aperture 22 that coincides with the corresponding aperture 20, and through which the corresponding rod 19 passes. Connected to the lower ends of these pivotally mounted plates 21 are the forward ends of retractile springs 23, the rear ends thereof being secured to the upturned flange of an angle plate 24, and the latter being formed integral with or fixed to a plate 25 that is arranged for sliding movement on the bottom of the box 14. Plates 24 and 25 are normally forced toward the front wall of housing 14 under the influence of a flat spring 24$^a$ that is secured to the rear wall of said housing, and the free end of which spring bearing against the rear side of the upturned flange of said plate 24.

Formed in plate 25 is a pair of longitudinally disposed guide slots 26, and passing therethrough are pins or rivets 27 that are in the bottom of the box. Seated in and projecting upwardly from the center of plate 25 is a pin or rivet 28 that engages in a slot 29 that is formed in the end of a lever 30, the latter being fulcrumed on a pin or rivet 31 that is seated in the bottom of box 14, and the outer end of said lever is slotted as designated by 32 in order to receive a pin or rivet 33 that projects upwardly from a short crank arm 34.

This crank arm is fixed on the lower portion of a vertically disposed shaft 35, the lower end of which is journaled in the bottom of box 14, and said shaft extending upwardly through the top flange of channel 10 through sill 11 and upwardly into the box 13, the upper portion of said shaft being journaled in a bearing 36 that is fixed to the rear wall of said box 13. Fixed on the upper end of shaft 35 above the bearing 36 is a cap 37, from the lower portion of which projects a short horizontally disposed arm 38, and pivotally connected to the outer end of said arm is the inner end of a push rod 39 that extends through an aperture 40 in the rear wall of housing 13, and the outer end of said rod being provided with a head or cap 41.

Overlying arm 38 is a horizontally disposed arm 42, one end of which is pivoted on a pin 43 that is seated in one of the walls of the housing 13, and secured to the end of said arm adjacent to its pivot point is the lower end of a retractile spring 44, the upper end of which is secured to a pin 45 that is seated in the wall of the box or housing. This spring 44 is arranged so that it tends to throw the opposite or free end of the arm 42 downwardly. Formed in the under side of arm 42 and adapted to receive the arm 38 when the same is shifted into an angular position, as will be hereinafter more fully described, is a notch or recess 46.

Arranged in the outer wall of housing 13 is the body 47 of a locking device, preferably of the type that is key controlled, and having a rotatably arranged cylinder 48, and the latter projecting into the chamber within the housing 13. Carried by the inner end of the cylinder 48 is a rearwardly projecting pin or plate 49 which, when the cylinder is rotated by proper manipulation of the key when inserted into the lock, engages the under side of the free end of arm 42 and lifts the same so as to permit the disengagement of arm 38 from notch 46.

Figure 3:
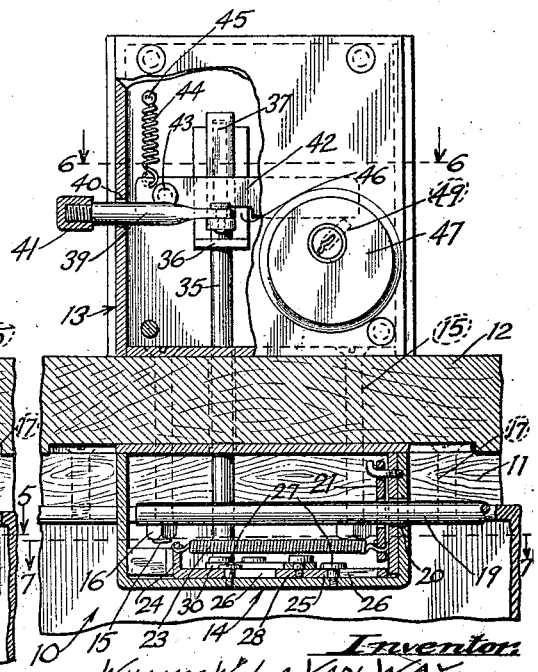
Fig. 3 is a vertical section similar to Fig. 2 and showing the operating parts of the lock in unlocked position so as to permit the clutch and brake pedals to be manipulated in the usual manner while the car is being operated.

Under normal conditions, or while the car that is equipped with my improved locking device is being driven by the owner or authorized person, the various parts of the device occupy the positions as illustrated in Figs. 3, 6, 7 and 8. Arm 42 occupies a horizontal position, inasmuch as its lower edge adjacent to the notch 46 rests upon the top of arm 38, and as long as plate 24 is retained in its normal position by spring 24$^a$, as illustrated in Fig. 7, spring 23 is inert, that is without tension, and as a result plates 21 occupy vertical positions as illustrated in Fig. 3 with their apertures 22 in direct alinement with apertures 20 so that as the pedals P are actuated in the operation of the car, the rods 19 connected to said pedals will move forwardly and rearwardly through the apertures 20 and 22.

When the owner of the vehicle leaves his car, the locking mechanism is set for operation by inward pressure upon head or cap 41 carried by push rod 39, and as the latter is moved inward a short distance, arm 38 will be swung into an angular position, as shown in Fig. 4, thereby permitting arm 42 to swing downward as the notch 46 moves into position above said arm 42, and the latter being swung upon its pivot under the influence of spring 44.

Shaft 35 is partially rotated as arm 38 is shifted by push rod 39, and following the partial rotation of said shaft, crank arm 34 will be swung from the position illustrated in Fig. 7 to the position illustrated in Fig. 5, thereby swinging lever 30 upon its fulcrum 31 and moving plate 25 and angle plate 24 rearwardly in housing 14 against the resistance afforded by spring 24$^a$, and consequently slightly expanding and imparting slight tension to retractile springs 23. As such action takes place, plates 21 will be swung into angular positions with respect to the vertical plane occupied by the front wall of housing 14, and with the parts so positioned the lock is set for operation.

A person attempting to steal the car to which my improved lock is applied, or to use the same without permission, must necessarily throw out the clutch in order to start the engine, and to do this, the clutch pedal must be pushed downwardly. As such movement takes place, the corresponding rod 19 will be drawn forwardly through the opening 22 in the corresponding plate 21 and through the opening in the front of housing 14. When the clutch pedal is released the tendency of the spring associated therewith is to restore said pedal to its normal position, but due to the angular position of the plate 21 through which the rod 19, that is associated with the clutch pedal, passes, said rod will be gripped by the edge of the opening 22 in plate 21 so that it will be effectually held against rearward movement. Thus it will be impossible for the person attempting to steal or use the car to operate the same. For to do so, it is necessary that the clutch be engaged before the engine may operate the driving shaft of the vehicle. Thus if the clutch pedal is pushed downwardly for any reason whatever while the lock is set for operation, it will be impossible for said lever to return to its normal position so that the engine will operate the car, and which action is due to the engagement of the rod 19 by the plate 21 when said rod is drawn forwardly by the clutch pedal as it is moved downwardly. Likewise, the foot brake will be rendered inoperative and locked against operation in the event that the pedal thereof is pushed downwardly. For by so doing the rod 19 associated therewith, will be engaged and locked in a forward position by the corresponding one of the plates 21.

The owner of the car, upon returning to the same, inserts the proper key in the lock 47 and rotates cylinder 48 so that the finger or plate 49 therein bears against the under side of the end of arm 42 and elevates the same to a substantially horizontal position. Such movement releases arm 38 from notch 46 and immediately following such movement the power stored in spring 24ª will force plates 24 and 25 forwardly to their normal positions within housing 24 thereby permitting the rod locking plates 21 to swing into their normal vertical positions, and simultaneously the connection between lever 30 and arm 34 will partially rotate vertically disposed shaft 35 thereby swinging the arm 38 away from the notch 46 and moving push rod 39 outwardly through opening 40, thus restoring the various parts of the locking device to their normal positions. As long as the plates 21 are maintained in their normal vertical positions they will not grip the rods 19 and consequently the clutch and brake pedals may be operated in the usual manner.

A motor vehicle locking device of my improved construction is comparatively simple, may be easily and cheaply produced, and is applicable for use in connection with practically all forms of motor vehicles.

Among the particularly novel and advantageous features of the invention to which I desire to call especial attention, are the arrangement of the operating parts of the locking mechanism in metal housings that are directly connected to the metal frame and wood sill of the vehicle, and the arrangement of the greater portion of the locking means beneath the floor of the vehicle, in which position it is out of sight and not readily accessible to thieves or persons who might attempt to use the vehicle without the knowledge or consent of the owner thereof.

It will be understood that minor changes in size, form and construction of the various parts of my improved lock may be made and substituted for those herein shown and described without departing from the spirit of my invention, the scope of which is set forth in the appended claims.

I claim as my invention:

1. A lock of the character described comprising a housing formed with openings, rods slidable through said opening and extending into said housing, locking plates pivotally mounted in the housing and having openings therein adaptable to register with the openings of said housing, a plate slidable in the housing, resilient members operatively connecting said plate and locking plates, said plate being capable of occupying one extreme position in which the resilient members are inactive to allow the locking plates to occupy non-locking positions, and another extreme position in which the resilient members are placed under tension to move the locking plates to gripping position with respect to said rods, and means for securing said plate in the last mentioned position.

2. A lock of the character described comprising a housing formed with openings, rods slidable through said openings and extending into said housing, locking plates pivotally mounted in the housing and having openings therein adaptable to register with the openings of said housing, a plate slidable in the housing, resilient members operatively connecting the plate and locking plates, said plate being capable of occupying one extreme position in which the resilient members are inactive to allow the locking plates to occupy non-locking positions, and another extreme position in which the resilient members are placed under tension to move the locking plates to gripping positions with respect to said rods, means for moving said plate to the last mentioned position comprising a shaft, an arm connected to the shaft, a push rod connected to the arm, a locking plate having a notch adapted to receive said arm for locking the shaft against rotation, means for urging the bar in the direction of the arm, and key operated means for moving said bar to released position with respect to said arm.

3. A lock of the character described comprising a housing having an opening therein, a rod slidable through the opening, a locking plate pivoted in the housing and movable to occupy one position in which the movement of the rod in one direction is prevented and another position in which the movement of the rod is permitted, a guided plate slidable in the housing and operatively connected to be moved into either of two positions, and key controlled means for moving said guided plate to effect operation of the locking plate.

4. A lock of the character described comprising a housing having an opening therein, a rod slidable through the opening, a locking plate pivoted in the housing, and movable to occupy one position in which the movement of the rod in one direction is prevented and another position in which the movement of the rod is permitted, a plate slidable in the housing and operatively connected to the locking plates to move the latter to either of said positions, a shaft operatively connected to said plate for moving the latter, an arm fixed to said shaft, a push rod connected to the arm to provide manual means for rotating the shaft, means for locking the shaft against rotation, and key operative means for releasing said locking means.

5. A lock of the character described comprising a housing having an opening therein, a rod slidable through the opening, a locking plate pivoted in the housing, and movable to occupy one position in which the movement of the rod in one direction is prevented and another position in which the movement of the rod is permitted, a plate slidable in the housing and operatively connected to the locking plate to move the latter to either of said positions, a shaft operatively connected to said plate for moving the latter, an arm fixed to said shaft, a push rod connected to the arm to provide manual means for rotating the shaft, a notched bar urged in the direction of said arm so that the arm reposes within said notch when in one position to prevent rotation of said shaft, and key operated means for moving the bar free of said arm.

In testimony whereof I have signed my name to this specification.

WILLIAM W. LA VAN WAY